July 21, 1931. P. SHELBY, JR 1,815,117
RIM EXTENSION FOR TRACTOR WHEELS
Filed July 24, 1930 2 Sheets-Sheet 1

INVENTOR.
Peter Shelby, Jr.

BY Lancaster, Allwine & Rommel
ATTORNEYS.

July 21, 1931.  P. SHELBY, JR  1,815,117
RIM EXTENSION FOR TRACTOR WHEELS
Filed July 24, 1930  2 Sheets-Sheet 2

INVENTOR.
Peter Shelby, Jr.
BY Lancaster, Allwine and Rommel
ATTORNEYS.

Patented July 21, 1931

1,815,117

UNITED STATES PATENT OFFICE

PETER SHELBY, JR., OF FENTON, MICHIGAN

RIM EXTENSION FOR TRACTOR WHEELS

Application filed July 24, 1930. Serial No. 470,473.

Tractors and the like are generally provided with extension rims, which may be fastened to the regular wheel rims to provide a larger tread area. This invention relates to connections for separably fastening such wheel rims and extension rims together.

An object of this invention is to provide connections for separably fastening wheel rims and extension rims together, which connections may be easily attached to conventional apertured wheel rims and extension rims, and which will, when attached thereto, easily and positively fasten the two together. Another object is to provide such connections which may be constructed in a simple and easy manner. Other objects later become apparent.

In the accompanying drawings:

Figures 1 and 2 respectively show a conventional tractor wheel and an extension rim therefor, these two being fastened together when it becomes necessary to provide additional wheel tread area, an example of the connections embodied by this invention being shown attached thereto.

Similar numerals refer to similar parts throughout the several views.

Figure 1:
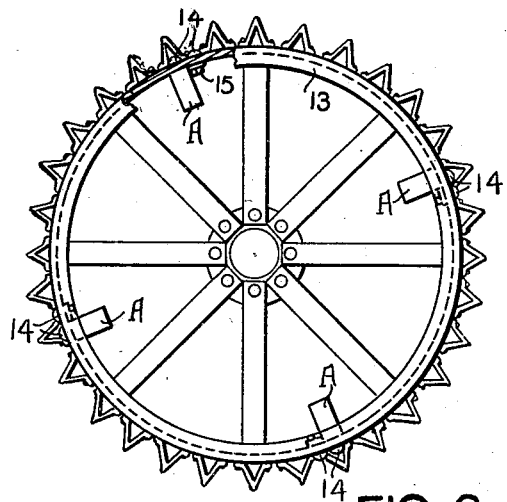
Figure 2:
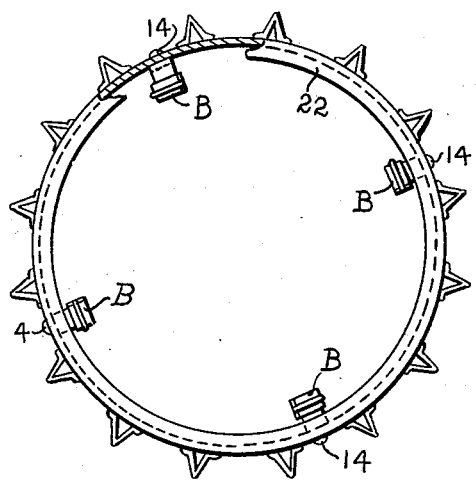

Having reference to the drawings, each connection is shown to consist of two main elements, a lug A for attachment to the inside circumference of a wheel rim, and a socket member B for attachment to the inside circumference of an extension rim, the two elements cooperating to form a connection which, when used in numbers, separably fastens the two rims together. Any number of these connections may be used, four being shown because this number is ample for ordinary use.

Tractor wheel rims are usually apertured for the reception of caulks or other purposes, the apertures sometimes being alined straight across the rim, and sometimes diagonally across it, this depending on the make of the tractor. The connections shown may be varied somewhat to accommodate them to these variously positioned holes, this not affecting the spirit of the invention however.

As shown, the lugs A are intended for attachment to a right hand wheel having apertures positioned diagonally across its rim. Each lug is cast from metal to form a base 10 having holes 11 and a tongue 12, this tongue being disposed at right angles to the base. The base 10 of each lug may be attached to the inside circumference of an apertured wheel rim 13 by bolts 14 and nuts 15, the tongue 12 in each instance projecting radially towards the axis of the rim.

The socket members B are each cast from metal to form a base 16 having holes 17, and a hook 18. This hook is formed with a lip 19 which projects from the inside face at the end of one of its sides, a screw threaded stud 20 being positioned through the central part of its opposite side. Preferably a strengthening rib 21 is formed about the hook's mid-section. The base 16 may be attached to the inside circumference of an apertured extension rim 22 by bolts 14 and nuts 15, the hook 18 being disposed with respect to the base 16 so that when the socket members are attached to the inside circumference of the extension rim 22 each hook will have its open end facing circumferentially about the rim and will project beyond one edge thereof.

Figures 3, 4:
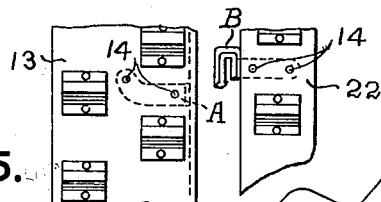
Figures 3 and 4 are respectively top plan views of the uppermost portions of the rim of the tractor wheel shown in Figure 1 and the extension rim shown in Figure 2, these last views showing the rims placed together with one of the connections positioned preparatory to fastening the two together.
Figure 5:
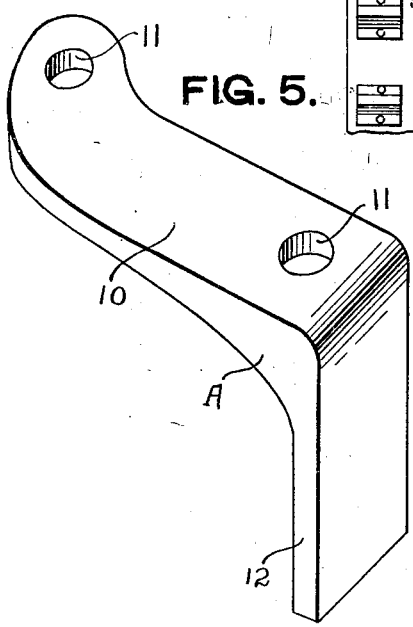
Figures 5 and 6 are detailed perspective views of the connection shown in Figures 3 and 4, as it appears when removed from the rims.
Figure 8:
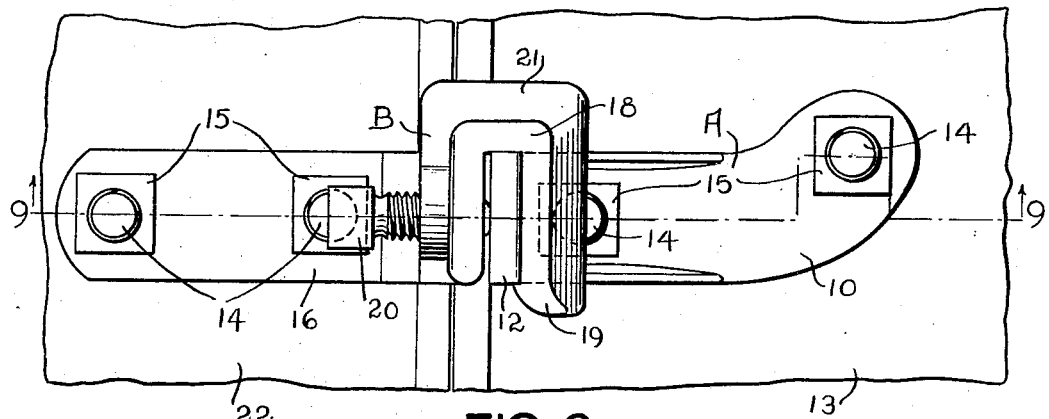
Figure 8 is a detailed view of the connection, attached to the wheel rim and extension rim and fastening the two together.
Figure 9:
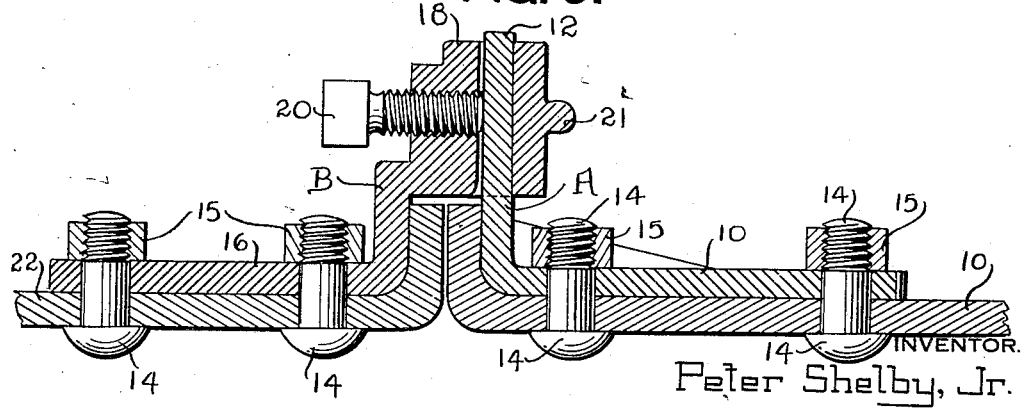
Figure 9 is a cross section on the line 9—9 of Figure 8.

The wheel rim 13 and extension rim 22 being supplied respectively with lugs A and socket members B, constructed and attached in the manner described, the mode of fastening the two rims together is as follows: The extension rim 22 is faced against the wheel rim 13, as shown by Figures 3 and 4, so that the hooks 18 of the socket members B will extend within the wheel rim and proximate the lugs A. The open ends of the hooks 18 are large enough to permit passage of the tongues 12 over the lips 19, these tongues fitting behind these lips upon their complete engagement by the hooks 18, as shown by Figure 8. By screwing in the studs 20 the tongues 12 will be clamped against the sides of the hooks 18 behind the lips 19.

Figure 6:
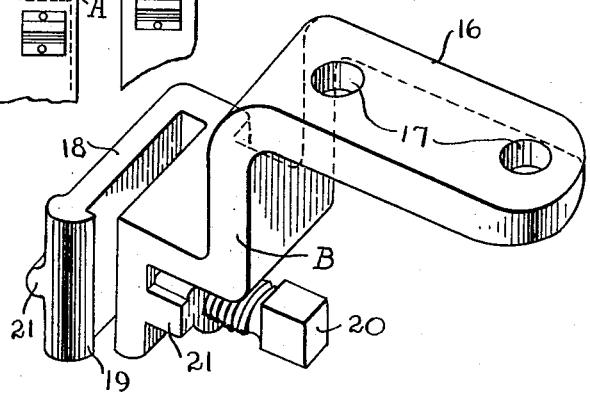
Figure 7:
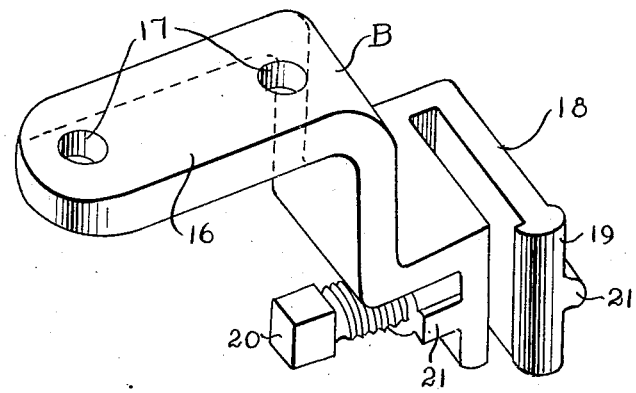
Figure 7 is a detailed view of that part of the connection which is shown by Figure 6, but reversed for application to a wheel rim to accommodate reversed rotation.

The socket member shown by Figure 7 is a reversed form of the one shown by Figure 6, this form being for attachment to a left hand wheel. The power from the wheel rim to the extension rim will ordinarily be applied to the closed ends of the hooks by the tongues of the lugs A. Should the direction of the wheel rim's rotation be reversed in backing the lips 19 will adequately transmit the necessary power, and are perfectly capable of accommodating this alternate service.

The connections described permit very quick fastening of the two rims together. They are easily engaged or disengaged by partial respective rotation of the rims one way or the other. When engaged they are exceptionally capable of rough usage. The parts are simple and strong, and the whole connection may be very cheaply and easily constructed.

It is desired that it be understood that the particular form shown is not intended to limit the appended claims thereto, but that these claims are intended to cover the invention broadly.

I claim:

1. A connection for separably fastening a wheel rim and an extension rim together, said connection comprising a lug for attachment to the wheel rim, a hook for attachment to the extension rim said hook being shaped for sidewise engagement of said lug and having a projection formed on the inside face of one of its sides at the end thereof, and means for clamping said lug against the side of said hook having said projection.

2. A connection for separably fastening a wheel rim and an extension rim together, said connection comprising a lug having a base for attachment to the inside circumference of the wheel rim said base and lug being angularly disposed so that the lug extends towards the axis of the wheel rim when attached thereto, a hook for engaging said lug and having a base for attachment to the inside circumference of the extension rim, said hook and base being respectively disposed so that the hook extends beyond the edge of the extension rim and the open end of the hook faces circumferentially about the inside of the extension rim when attached thereto, the inside face of one side of said hook having a projection formed at its end, said hook being formed to permit passage of said lug over said projection, and means for clamping said lug against the side of said hook having said projection.

3. A connection for separably fastening an apertured wheel rim and an extension rim together, said connection comprising a lug having a base in which a plurality of apertures are formed to aline with a corresponding number of apertures in the wheel rim, a hook for attachment to the extension rim said hook being shaped for sidewise engagement of said lug and having a projection formed on the inside face at the end of one side thereof, and means for clamping said lug to the side of said hook having said projection when said lug is engaged behind said projection.

4. A connection for separably fastening an apertured wheel rim and an extension rim together, said connection comprising a lug having a base for attachment to the inside circumference of the wheel rim said base having a plurality of apertures formed therein to aline with a corresponding number of apertures in the wheel rim said lug and base being angularly disposed so that said lug extends towards the axis of the wheel rim when attached thereto, and a hook having a base for attachment to the extension rim said hook and base being respectively disposed so that the open end of said hook extends beyond one edge of and faces circumferentially about the extension rim when attached thereto, the inside face of one side of said hook having a raised lip formed at its end behind which said lug may be positioned upon engagement in said hook, a screw stud being arranged in the opposite side of said hook so that said stud may be screwed into contact with said lug clamping same behind said projection.

5. A connection for separably fastening a wheel, having radially extending elements, and an extension rim together, comprising a hook attached to the extension rim, said hook shaped for sidewise engagement of one of the radial elements of the wheel and having a projection formed on the inside face of one of the sides at the end thereof, and means for clamping said radial element against the side of said hook having said projection.

PETER SHELBY, Jr.